United States Patent [19]

Thierry et al.

[11] 4,230,388
[45] Oct. 28, 1980

[54] CONNECTION HOUSING FOR ALIGNED BUS BARS

[75] Inventors: Jean-Pierre Thierry, Genlis; Alain Debionne, Pont de Pany; Daniel Nourry, Dijon, all of France

[73] Assignee: La Telemecanique Electrique, France

[21] Appl. No.: 62,083

[22] Filed: Jul. 30, 1979

[30] Foreign Application Priority Data

Jul. 31, 1978 [FR] France .................... 78 22563

[51] Int. Cl.³ .................................. H01R 11/09
[52] U.S. Cl. .......................... 339/74 R; 339/205; 339/255 R
[58] Field of Search ............... 339/74 R, 205, 208, 339/253 R, 253 F, 253 L, 254 R, 254 M, 255 R, 255 A, 255 L, 256 R, 256 S

[56] References Cited

U.S. PATENT DOCUMENTS

| 2,392,438 | 1/1946 | Wade | 339/205 |
| 2,703,395 | 3/1955 | Long | 339/205 |

FOREIGN PATENT DOCUMENTS

| 1118852 | 12/1961 | Fed. Rep. of Germany | 339/74 R |
| 2173375 | 5/1973 | France | |
| 2275964 | 6/1974 | France | 339/74 R |
| 211274 | 2/1967 | Sweden | 339/255 R |

Primary Examiner—John McQuade
Attorney, Agent, or Firm—William Drucker

[57] ABSTRACT

A connection means serves for the electrical coupling of ends of bus bars situated in protection sheaths, and has clips under the action of resilient members and associated with each phase to be connected, the clips being actuated by as many locking means as there are phases to be coupled. The heads of the locking means have a shape and arrangement such that the mechanical association of the upstream and downstream sheath ends can only be effected in the open state of the clips, while the positive closing of the device can only be effected in the inverse state.

7 Claims, 4 Drawing Figures

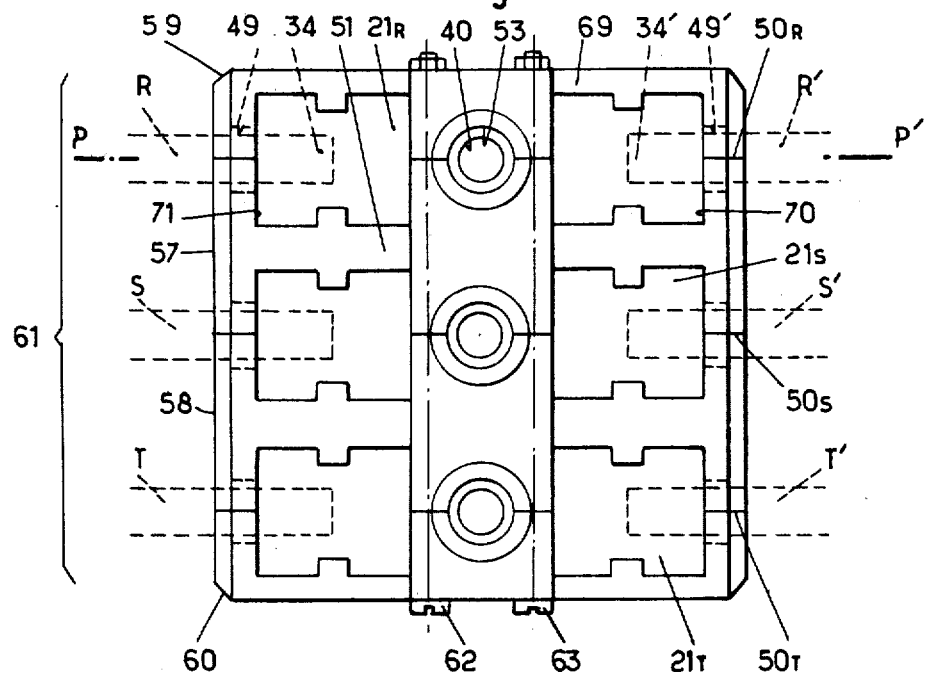
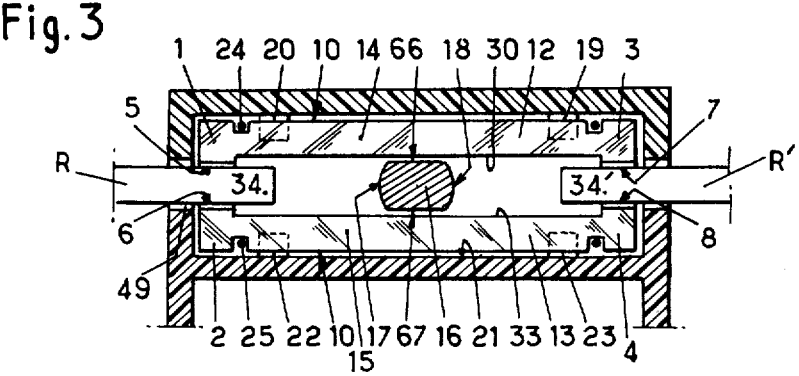
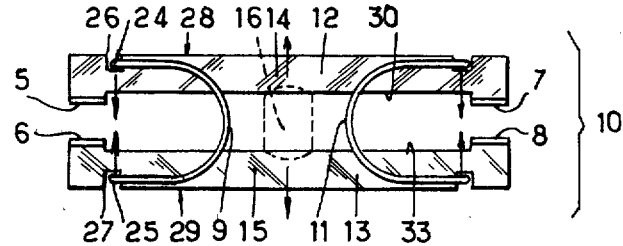

CONNECTION HOUSING FOR ALIGNED BUS BARS

This invention relates to a connection means for electrical coupling of the ends of bus bars, of rectangular section and placed parallel at the interior of a protection sheath, to other similar bus bar ends placed in opposed position, and comprising conductive clips which are applied resiliently on the ends of two bars, each situated in the same plane, by the action of a rotary locking member, whilst housings placed on insulating elements disposed between the bus bar ends and parallel to the bars provide support and insulation of the clips.

THE PRIOR ART

A device in accordance with this arrangement is known, for example, from French Patent No. 2173375 and can give rise to the occurrence of an irregular distribution of the contact pressure of the clips on the bars, resulting for example from creep of the insulating materials or from a non-homogeneous temperature distribution.

OBJECT OF THE INVENTION

The object of the invention is accordingly to provide a connection means the general structure of which corresponds to that set forth above but in which measures are taken to remedy the inconveniences referred to.

Complementary features adapted to the putting into operation of the above will moreover permit retention of an advantage presented by the prior art relating to the obtaining of a guarantee of closing of the clips before the placing in position of a closing cover or plate.

SUMMARY OF THE INVENTION

According to the present invention, this result is obtained in that, with each pair of ends of coplanar bars there is associated at least one clip constituted by two rigid contact bridges, perpendicularly to this plane, the ends of which disposed respectively one opposite the other and carrying contact buttons are submitted locally to the action of a resilient element which urges them towards each other, arms of these contact bridges being disposed at each side of a rotary locking means which has cam surfaces cooperating with said arms so as, when in a predetermined angular position, to separate said arms, and which is pivoted in two bearings disposed on said insulating members at each side of said housing.

BRIEF DESCRIPTION OF THE DRAWINGS

Other features will be apparent from the following description of a non-limiting method of construction of the invention, illustrated in the accompanying drawings, wherein:

FIG. 1 is a elevation of insulating members, and ends of bus bars, in the absence of the clips and the locking means;

FIG. 3 is a partial view in section of the device, taken on the plane Q shown in FIG. 2; and FIG. 4 is an elevation of a contact clip provided with these resilient elements, seen in the same situation as in FIG. 3.

Figure 2:
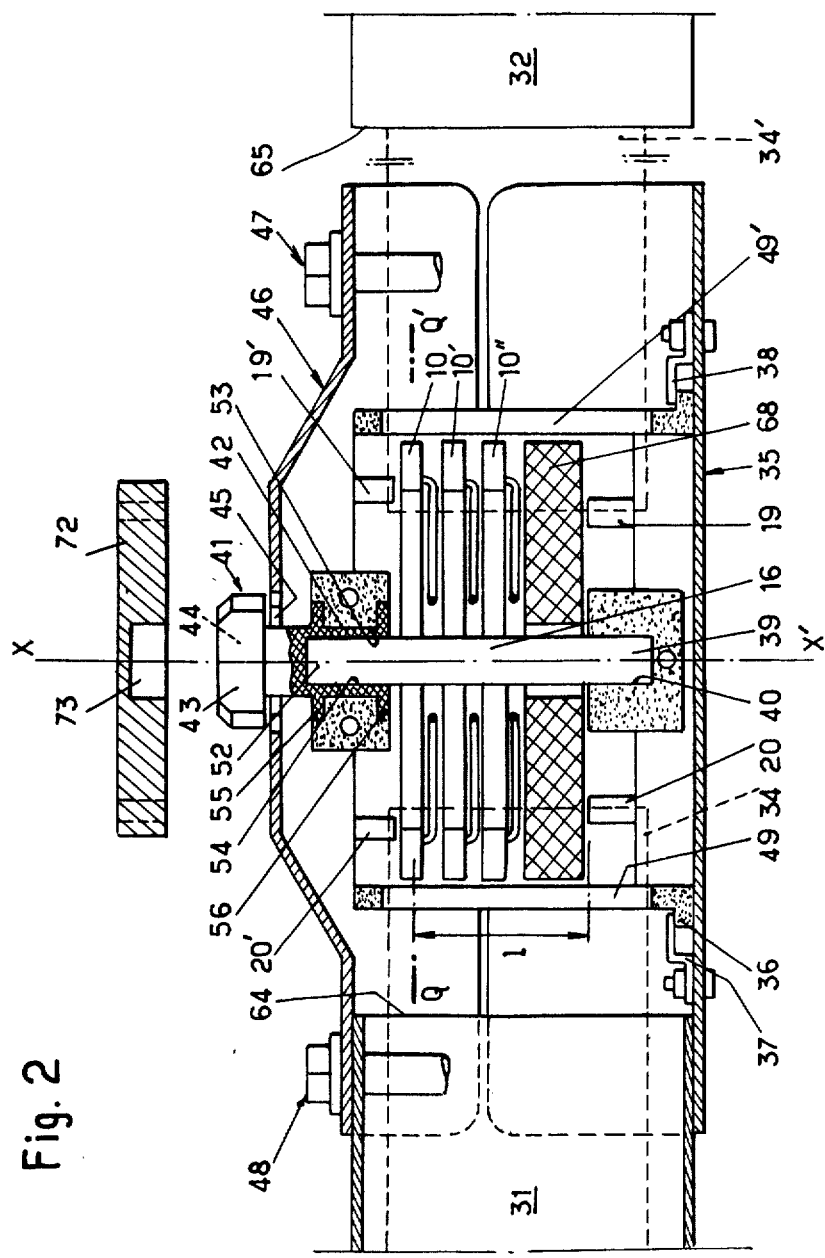
FIG. 2 is a section taken on the plane P,P' in FIG. 1.

A connection means intended for the electrical connection of ends of bus bars comprises an insulating casing 61 seen in FIG. 1, wherein R,S,T and R',S',T' represent in broken line the upstream and downstream bars.

The bars of a same phase, for example the bars R, R', enter by their respective ends 34, 34' into the interior of housings, for example with the housing $21_R$ and are situated in a same plane P,P'. For this purpose, lateral openings 49,49' are formed in two opposed faces of the casing. Other housings $21_S$, $21_T$ are provided for the other bars.

The casing 61 is formed by the association of moulded insulating parts 59, 57, 58, 60 abutting one another at joint planes such as $50_R$, $50_S$, $50_T$, in such a manner as to permit the placing in position of connection clips in each of the housings. Support of these elements is obtained for example by means of threaded rods such as 62, 63.

These clips are retained in these housings and isolated from neighbouring housings by separating walls such as 51, whilst fixing members, such as 37, 38, serve to associate the casing in a permanent manner with a sheath, see FIG. 2.

Referring to FIG. 4, there is seen one of the clips 10 serving for electrical coupling. This clip is constituted by two contact bridges 12, 13 the respective contact buttons, 5, 7 and 6, 8 of which are placed at the ends of two arms 14, 15. These arms, which are situated in the same plane and in such a manner that their respective contact buttons 5, 6 and 7,8 are placed opposite to each other, are associated by two springs 9,10 in the form of a U, the bent ends of which, such as 24, 25, enter into notches such as 26, 27 opening at the surfaces 28, 29 of the contact bridges disposed towards the exterior; the surfaces 30, 33 which are opposite to them, when the apparatus is assembled, are placed at each side of a member shown at 16.

The springs 9,10 serve to transmit to the contact bridges the forces localised in the vicinity of the contact buttons and directed one towards the other.

When a clip 10 is placed in a housing such as 21, shown in FIG. 3, a rotary element 16 is placed between the arms 14, 15. This rotary element, referred to as the locking element, in effect has a shape such that, for one of two angular positions, the springs cause an approach of the contact buttons are separated. In the position illustrated in FIG. 3, the locking element has two flats 66, 67 opposite to the respective surfaces 30 and 33 which permits the opposed contact buttons to be applied on the opposed faces of the ends of bus bars, respectively 34 and 34'.

When the locking element performs a rotation of a quarter of a turn, the cam surfaces 17, 18 cooperate with the surfaces 30, 33 to separate the contact bridges; it is clear that this latter position is that which is necessary for the placing in position of the ends of the bars when it is necessary to cause them to enter the housing.

As can be seen in FIG. 2, which corresponds to a view in section taken on the plane PP' of FIG. 1, the housing 21 is traversed by the locking element 16. This latter is pivoted at its ends 39 and 52 in two respective bearings 40 and 53 having an axis XX', terminating in the said housing. Moreover, the dimension 1 of this housing measured parallel to the axis, is selected such that several clips such as 10, 10',10" can be associated in parallel with the same locking element.

This feature gives the possibility of using only that number of clips necessary for the carrying of a predetermined current. When the housing is not entirely occupied by clips, an insulating block such as 68 can occupy the non-used space.

Whilst the clips are retained in their plane by walls such as 51, 69 and the surfaces 70, 71 adjacent to the openings 49, 49', the maintenance in position of the clips, in a direction parallel to the axis XX', is carried out by bosses such as 19, 20, 22, 23 visible in FIG. 3, and 19', 20' seen in FIG. 2, which determine the dimension l of the housing.

It is clear that the plays present between the walls and the clips will permit the latter to open.

In order to permit the operation of the locking element 16, an element 41 of insulating material and having an opening 54 is slid on the extremity 52.

This element 41 comprises, at the end opposite to the element 16, a head having two external plane surfaces 43, 44 to permit its operation with the aid of a tool. These surfaces are obtained for example by lateral milling of a cylindrical surface. Moreover, the element 41 comprises a surface of revolution 42 which is coaxial with XX' and which is bounded by shoulders 55, 56; these surfaces and shoulders cooperate with the bearing 53 to permit the pivoting and the axial retention of the locking element.

As already mentioned, the insulating casing 61, formed by the association of the insulating parts 57–60, is fixed on an end of a sheath.

FIG. 2, wherein the bus bars are indicated in broken line, shows how association is obtained between two sheath ends. A first half cheek 35 receiving the said casing is fast with an upstream sheath end 31 and has for example a section in the form of a U; a downstream sheath end 32, of shape and section identical to that shown at 31, can thus be guided by this half cheek so that the bar ends 34' which it carries can enter the insulating casing.

When this operation has been carried out, a cover 46 constituted by a second half cheek similar to the one described above is placed in position on the sheath ends 31, 32 not covered by the first half cheek 35. Bolts such as 47, 48, which connect the two cheeks, permit the obtaining of an effective coupling.

Steps are also taken to assure that all of the clips are in an open condition before the placing in position of the second cheek can be carried out. These steps permit a guarantee of good alignment of the upstream and downstream sheaths being obtained by the tightening of the bolts 47, 48, before there is electrical connection resulting from closing of the clips.

The portion of the movable half cheek 46 which is placed opposite to operating heads, such as 41, 43, 44 has as many openings 45 as there are locking elements; these openings have a profile corresponding to that formed by the flats 43, 44 and the length of the head of the element 41 is such that the placing in position of the half cheek 46 can only take place when these elements 41 traverse these openings 45. As the arrangement of these openings correspond to a position of the heads 41 which places the control members in a state wherein there is separation of the contact bridges, there is an absolute guarantee that the mechanical securing of the upstream and downstream sheath ends can only be effected in the open condition of the clips.

When the mechanical assembly has been carried out, the heads of element 41 extend beyond the half cheek and indicate, by their position, the state of connection or disconnection of the device.

An insulating cover 72, comprising housings 73 the shape of which corresponds to that of the heads, will then be applied on the half cheek 46, to cover over the gaps existing in the region of the openings 45. By reason of the arrangement of the profiles of the housings 73, this can only be carried out if all of the heads 41 have pivoted through 90° and, consequently, if all of the clips are in a closed state.

The presence of this cover consequently ensures an indication, and a guarantee, that the electrical connection of two adjacent sheaths has been obtained.

We claim:

1. In a connecting means, for the electrical coupling of ends of first bus bars of rectangular section, placed parallel at the interior of a protection sheath, to other similar bus bar ends placed opposite to said first bus bars, said means comprising conductive clips which are each applied resiliently on the ends of two bars situated in a same plane, and housings in insulating members disposed between the bus bar ends and parallel to the bars serving for the support and insulation of the said clips, the improvement that, with each pair of ends of coplanar bars there is associated at least one clip constituted by two rigid contact bridges perpendicular to said plane, the extremities of which bridges, placed opposite to each other and carrying contact buttons, are submitted locally to the action of a resilient element which urges them together, respective arms of said contact bridges being disposed at each side of a rotary locking element which has cam surfaces cooperating when in a predetermined position with said arms to separate them, said rotary locking element being pivoted in two bearings on insulating elements at each side of a housing for said clips.

2. A connecting means, according to claim 1, wherein said housing has, parallel to the axis of pivoting of the locking element, a dimension l which permits the placing in parallel of several clips disposed in such a manner as to cooperate with a same rotary locking element.

3. A connecting means according to claim 1, wherein said insulating elements are secured on a first half cheek integral with one sheath of two sheaths which contain sets of bus bars to be connected.

4. A connecting means, according to claim 3, wherein an extremity of each rotary locking element comprises external prismatic actuating surfaces adapted to cooperate with a tightening tool, and wherein a second half cheek adapted to be associated with two ends of adjacent sheaths, comprises as many openings as there are locking elements, and wherein each of these openings is of such form, position and orientation that said second half cheek can only be associated with the sheaths if the said locking elements are in a predetermined angular position and if said locking elements pass through the said openings.

5. A connecting means, according to claim 4, wherein said actuating surfaces are carried by an insulating member engaged on the end of the locking element, and wherein said insulating member has a surface of revolution and at least one shoulder cooperating with the adjacent bearing.

6. A connecting means, according to claim 1, wherein each resilient element is constituted by a resilient wire having the general shape of a U, the ends of which each have a bent extension, these extensions being engaged in two notches opening in respective surfaces of the respective contact bridges opposite to the surfaces which cooperate with the cam surfaces corresponding thereto.

7. A device, according to claim 3, wherein, when a second half cheek is associated with the first half cheek, locking elements place the clips in the open position, and wherein a cover, having housings of shape similar to that of the openings, can only be fixed on the said second half cheek when the locking elements place the clips in the position of closing the contact bridges.

* * * * *